(12) United States Patent
Zolla et al.

(10) Patent No.: US 7,506,429 B2
(45) Date of Patent: Mar. 24, 2009

(54) METHOD OF CONSTRUCTING A MAGNETIC SENSOR

(75) Inventors: Howard Gordon Zolla, San Jose, CA (US); Edward Hin Pong Lee, San Jose, CA (US); Kim Y. Lee, Fremont, CA (US); Tsann Lin, Saratoga, CA (US); Chun-Ming Wang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 488 days.

(21) Appl. No.: 11/053,118

(22) Filed: Feb. 7, 2005

(65) Prior Publication Data

US 2005/0135019 A1    Jun. 23, 2005

Related U.S. Application Data (62) Division of application No. 10/243,271, filed on Sep. 12, 2002, now abandoned.

(51) Int. Cl.
*G11B 5/127* (2006.01)
*H04R 31/00* (2006.01)

(52) U.S. Cl. ............... 29/603.16; 29/603.13; 29/603.15; 29/603.18; 204/192.34; 216/62; 216/65; 216/66; 360/324.11; 360/324.12; 360/324.2; 427/127; 427/128; 451/5; 451/41

(58) Field of Classification Search . 29/603.11–603.16, 29/603.18; 360/324.2, 324.12, 324.11; 216/62, 216/65, 66; 428/692, 694; 427/127, 128; 204/192.34

See application file for complete search history.

(56) References Cited

U.S. PATENT DOCUMENTS

| | | | |
|---|---|---|---|
| 5,777,542 A | 7/1998 | Ohsawa et al. | 338/32 R |
| 6,209,193 B1 | 4/2001 | Hsiao | 29/603.15 |
| 6,255,040 B1 | 7/2001 | Sasaki | 430/320 |
| 6,327,116 B1 | 12/2001 | Watanabe et al. | 360/126 |
| 6,356,419 B1 | 3/2002 | Gill | 360/324.11 |
| 6,634,087 B2 * | 10/2003 | Horng et al. | 29/603.08 |
| 6,778,364 B2 * | 8/2004 | Dobisz et al. | 360/324.12 |
| 6,844,998 B2 * | 1/2005 | Aoki et al. | 360/322 |
| 2001/0001256 A1 | 5/2001 | Hsiao | 360/246.6 |
| 2001/0004797 A1 | 6/2001 | Hsiao | 29/603.07 |
| 2003/0189799 A1 * | 10/2003 | Yanagisawa et al. | 360/322 |

* cited by examiner

*Primary Examiner*—Paul D Kim
(74) *Attorney, Agent, or Firm*—Zilka-Kotab, PC (57) ABSTRACT

A magnetoresistive sensor having a well defined track width and method of manufacture thereof.

3 Claims, 8 Drawing Sheets

METHOD OF CONSTRUCTING A MAGNETIC SENSOR

REFERENCE TO RELATED APPLICATION

This is a divisional of U.S. patent application Ser. No. 10/243,271 filed on Sep. 12, 2002 now abandoned.

BACKGROUND OF THE INVENTION

1. Field of the Invention

The present invention relates to magnetoresistive sensors and more particularly to a lead overlay sensor design that provides for reduced trackwidth size and improved trackwidth control.

2. Description of the Related Art

Digital memory lies at the heart of all computer systems. Magnetic Disk Drives provide the this memory function in most modern computers systems, due to their ability to inexpensively store large amounts of data in such a manner that the data can be immediately, randomly retrieved. A magnetic disk drive includes one or more rotating magnetic disks, magnetic write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating. When the disk rotates, viscous forces in the air cause the air immediately adjacent to the disk to move with the disk. The ABS is aerodynamically configured to allow the slider to fly upon this moving air immediately adjacent to the disk surface.

As the disk moves past the slider, the write head emits magnetic flux pulses in order to imprint a magnetic signal onto the disk. These magnetic signals can then be read by the read head by moving the slider over a desired track and reading the magnetic signal as it moves past the read head.

Various magnetic sensors have been used to read data from a magnetic medium. Some prior art disk drives have used anisotropic magnetoresistive (AMR) sensors, while more recently disk drive devices have employed giant magnetoresistive sensors (GMR) also known as spin valves. Various other sensors have been proposed as well, such as tunneling magnetoresistive sensors (TMR). At present, GMR sensors are by far the most widely used and as such will be described in more detail herein. GMR sensors operate on what has been called the "spin valve effect", and includes a non-magnetic conductive spacer material sandwiched between layers of magnetic material. The layer at one side of the side of the spacer material has a magnetic moment that is pinned in a given direction, this layer is generally referred to as the pinned layer. The magnetic material at the other side of the spacer layer has a magnetization that is biased perpendicular to that of the pinned layer, but is free to rotate in the presence of a magnetic field. This layer is generally referred to as the free layer. The selective spin scattering of electrons passing through the sensor causes the electrical resistance of the sensor to change as the angle of the magnetization of the free layer relative to that of the pinned layer changes. In this way, as the moves passed a magnetic field produced by the passing magnetic disk, the angle of the free layer magnetization changes, thereby changing the resistance of the sensor. This change in resistance is detected by passing a sense current through the sensor and detecting the voltage change across the sensor.

The computer industry constantly requires larger memory storage capacity in ever smaller devices. One way to increase data storage efficiency is to reduce the width of a track of data. The reduction of track width allows more tracks of data to be stored on a single disk. One attempt to minimize track width can be more readily understood with reference to FIG. 1 which describes a read sensor 10 having a lead overlay design. The sensor 10 is built upon a gap layer 12, which is an electrically insulating, non-magnetic material. An antiferromagnetic material 14 is formed over the gap layer and is used to fix the magnetization of a magnetically pinned layer 16, in a manner which will be familiar to those skilled in the art. An electrically conductive, non-magnetic spacer layer 18 is formed over the pinned layer, and a magnetically free layer 20 is formed over the spacer layer 18 at the side opposite the pinned layer. Hard bias layers 24 are formed at either side of the sensor 10. The hard bias layers are constructed of a material having a high magnetic moment when magnetized acts to bias the magnetization of the free layer in a desired direction due to magnetostatic forces between the hard bias material 24 and the free layer 20. In the lead overlay design described herein, electrical leads 26 are formed over the top of the sensor 10 at portions of the sensor. The leads 26 provide the sense current to the sensor, and as will be appreciate by those skilled in the art, the track width TW of such a design is defined as the distance between the leads. Prior art lead overlay designs and methods of manufacture make accurate track width definitions somewhat difficult as will be described in greater detail below in a discussion of the prior art methods of making such lead overlay sensor.

Figure 1:
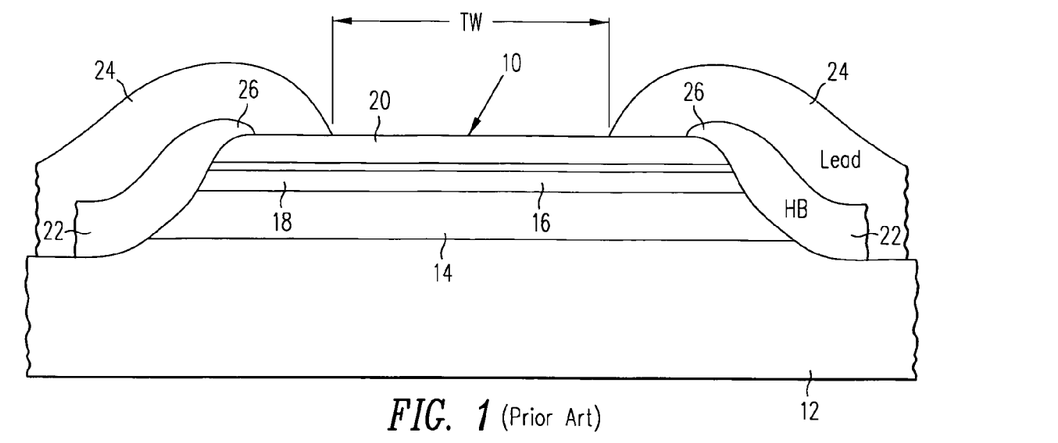
FIG. 1 is a cross sectional view, not to scale, of a prior art lead overlay read sensor.

With continued reference to FIG. 1, the hard bias material 22 tends to slightly overlap the free layer 20, resulting in what has been called a "birds beak" 26. Such a birds beak 26 is undesirable because it results in magnetic instability in the free layer.

Figure 2:
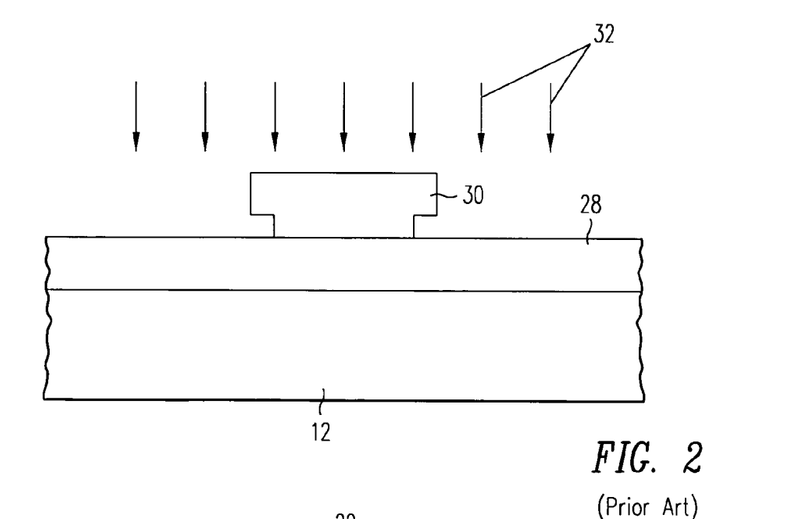
FIG. 2 is a cross sectional view, not to scale of a step in a prior art process of making a read sensor.
Figure 3:
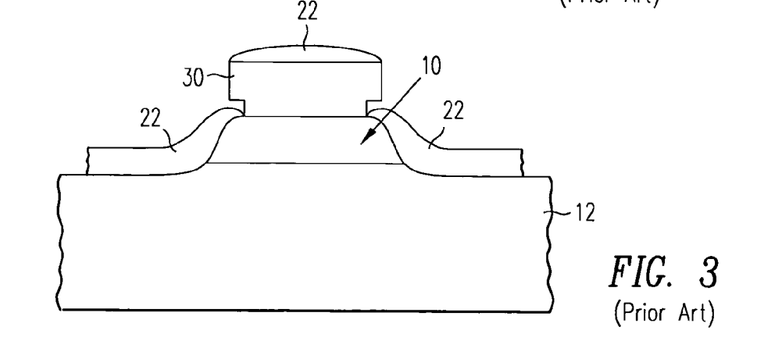
FIG. 3 is a cross sectional view, not to scale of a step in a prior art process of making a read sensor.
Figure 4:
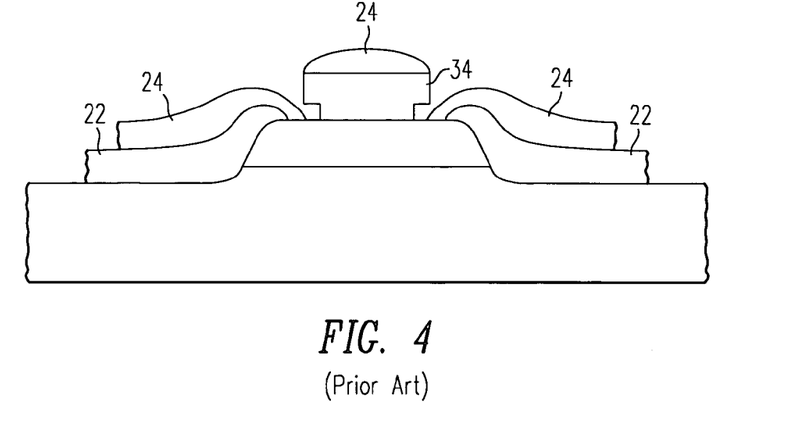
FIG. 4 is a cross sectional view, not to scale of a step in a prior art process of making a read sensor.

With reference to FIGS. 2 through 4 an exemplary method of manufacturing such a lead overlay sensor 10 will be described. With reference to FIG. 2, a layer of sensor materials 28 is formed over the gap material 12. The layer of sensor material could include the various layer making up the sensor 10 as described with reference to FIG. 1 or could be layers making up some other type of sensor such as ARM, TMR etc. A first mask 30, which could be a bi-layer photoresist mask is formed over the sensor layer 28 and is formed of such a width as to define the edges of the sensor. An ion milling process indicated by arrows 32 is used to remove sensor material not protected by the mask 30. This process is generally referred to in the industry as the K2 milling process, or just K2. After the ion milling process 32 has been completed, the hard bias layers 22 are deposited, using the same mask 30 that was used to define the edges of the sensor 10. As can be seen with reference to FIG. 3, this method of construction allows the hard bias layers 22 to slightly overlap the sensor 10. After the hard bias 22 has been deposited, the first mask 30 is removed. The first mask 30 is replaced with a second mask 34, which is narrower than the first mask, and can also be constructed as a bi-layer photoresist structure. As will be seen, this second mask defines the track width dimension. With the second mask 34 in place, the lead material is deposited. As can be seen with reference to FIG. 4, since the second mask 34 is narrower, than the first mask 30, the lead material can be deposited directly onto the sensor at side portions of the sensor extending inward from the inner edges of the hard bias material 22. This step forming the second mask 34 and forming the leads 24 is referred to in the industry as "K5". With the lead layer formed, the second mask layer 34 can be removed and a cap layer (not shown) can be deposited to protect the sensor from subsequent manufacturing process that will be familiar to those skilled in the art.

As will be appreciated from the above, the track width is defined by the second mask 34. However, as can be seen, this critical photolithographic step is performed on a surface having a severe topography rather than on planar surface as would be desired. This makes accurate photolithography difficult, and as a result makes accurate definition of the track width difficult. In addition, the thickness with which the leads can be deposited is limited, because depositing too much lead material would completely cover the resist structure 34 making it impossible to remove.

From the above it will be appreciated that there remains a need for a magnetic sensor design that provides for very accurate track width definition, while utilizing presently implemented manufacturing techniques. There also remains a need for a lead overlay design, and method of manufacture, that will minimize the effects of hard bias birds beaks.

SUMMARY OF THE INVENTION

The present invention provides a mangnetoresistive sensor having a well defined track width. The sensor of the present invention includes a layer of magnetoresistive sensor material having a central active region and end regions at opposite ends of the sensor. The end regions terminate at first and second portions of the sensor. First and second electrically conductive pads are formed on each of the end regions and terminate at the first and second sides. First and second hard bias layers are formed at the first and second sides of the sensor material, and first and second lead layers are formed over at least a portion of the first and second electrically conductive pads, and the first and second hard bias material.

The present invention can be formed by a method wherein, a layer of electrically conductive material is deposited over a full film of sensor material, with a first photolithographic process being employed to form a gap in the electrically conducive material. Thereafter, a second photolithographic process may be employed to selectively remove lead material and sensor material to define a sensor having opposite sides. The photolithographic process used to define the sensor, may use a photoresist mask having a width that is essentially the same as the desired width of the sensor. This same mask may also be used to form first and second hard bias layers at the sides of the sensor, and to form electrically leads contacting the hard bias material and at least a portion of the earlier deposited electrically conductive material. The layer of lead material deposited in this last lithographic step may be significantly thicker than the layer of, electrically conductive material deposited in the first lithographic step.

The first photolithographic step forms the gap in the first deposited electrically conductive material thereby defines the track width of the invention. Advantageously, this photolithographic step is performed on a planar surface and as such can be performed very accurately, allowing the sensor to be constructed with a smaller, more controllable trackwidth. Furthermore, the electrically conductive material deposited in conjunction with the first lithographic process can be deposited very thin. This allows a thinner mask to be used in the first photolithographic step, further facilitating narrower, more controllable track width definition.

After the second photolithographic procedures has defined the sides of the sensor, the sensor could be described as having a flat upper surface terminating at first and second edges with laterally opposed sensor sides extending downwardly from the edges. The sensor sides may be sloped at an angle. The first layer electrically conductive material at this point may be described as first and second thin lead pads formed on the flat upper surface of the sensor at opposite end regions of the sensor. The region between these thin lead pads may be described as the central, active region of the sensor, and defines the trackwidth of the sensor.

Hard bias material layers may be formed to extend from and contact the side of the sensor, and may or may not slightly overlap the thin lead layers. It is an advantage of the present invention, the that the thin lead layers deposited onto the sensor prevent the hard bias material from contacting the flat upper surface of the sensor and thereby limit contact to only the sides of the sensor. Contact between the hard bias layers and the upper surface of the sensor (known in the art as a "birds beak") results in magnetic instability of the sensor, by interfering with the magnetic properties of the free layer of the sensor.

With the hard bias material deposited, another layer of electrical material may be deposited onto at least a portion of the first and second thin lead pads and onto at least a portion of the hard bias material. This second layer of lead material may be significantly thicker than the layer used to form the first and second pads, and is deposited by a photolithographic process resulting in lead portions that contact the electrically conductive pads and extend laterally outwardly from the sensor. It will be appreciated the photolithographic process used to define the thicker, later applied lead material is much less critical than that of the first two lithographic processes which defined the track width and the sensor width. It is an advantage of the invention that this less critical photolithographic step is conducted on a non-planar surface, while the more critical track width defining photolithography is performed on a planar surface.

Another advantage of the present invention is that by using a thin layer of lead material, the track width defining inner edge of the thin lead pads can be formed with a well defined edge rather than a loosely defined tapered edge.

These and other aspects and advantages of the present invention will be better appreciate upon reading the following description taken together with the accompanying figures.

DETAILED DESCRIPTION OF THE PREFERRED EMBODIMENTS

Figure 5:
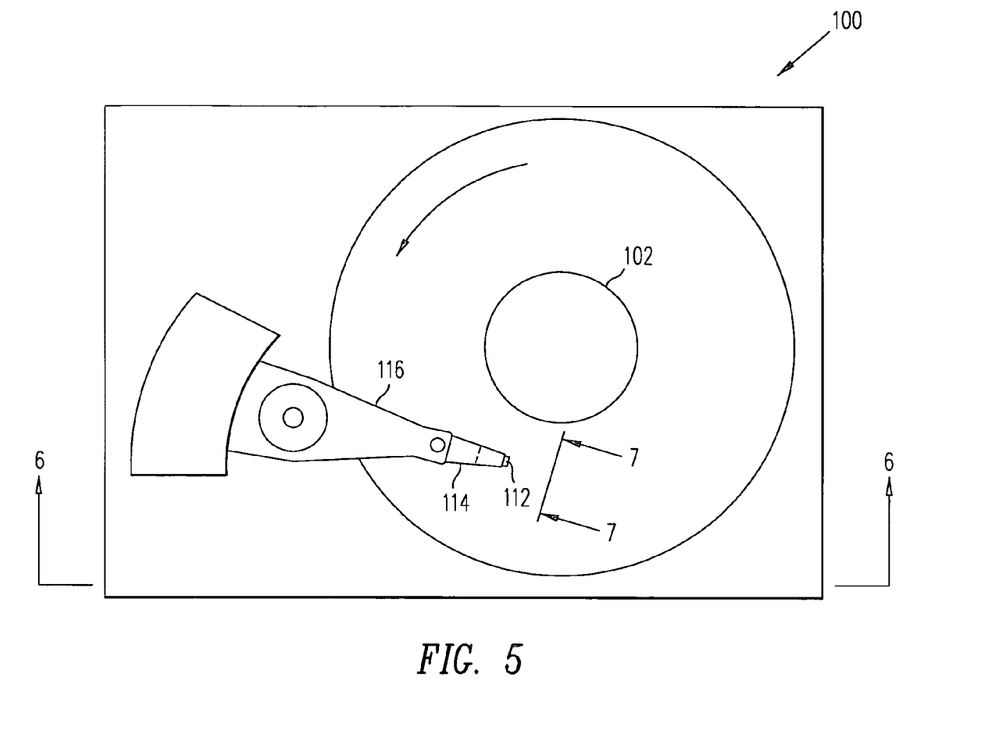
FIG. 5 is a plan view, not to scale, of a disk drive incorporating magnetic head according to the present invention.
Figure 6:
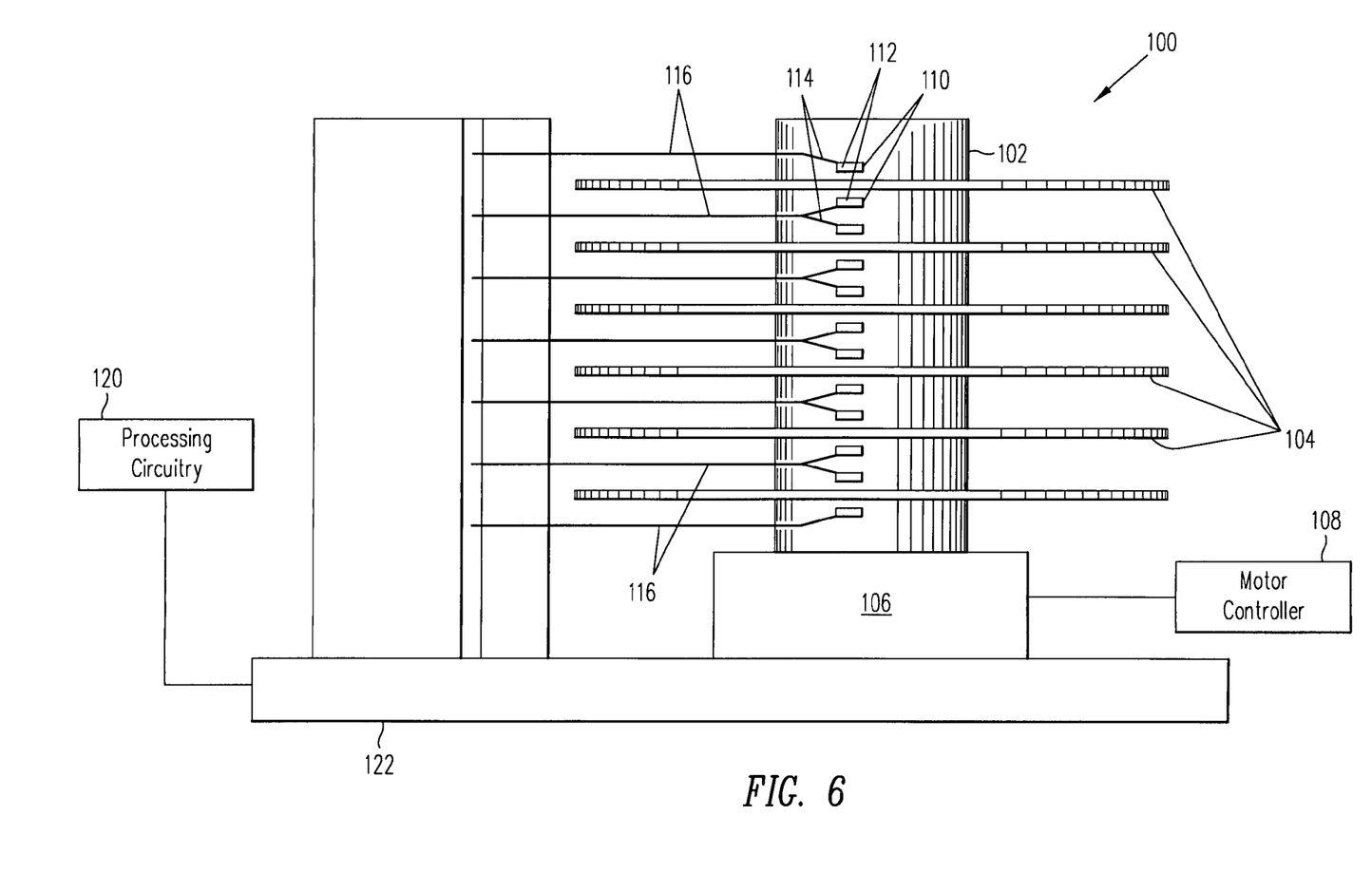
FIG. 6 is a profile view, not to scale, taken along line 6-6 or FIG. 5.
Figure 7:
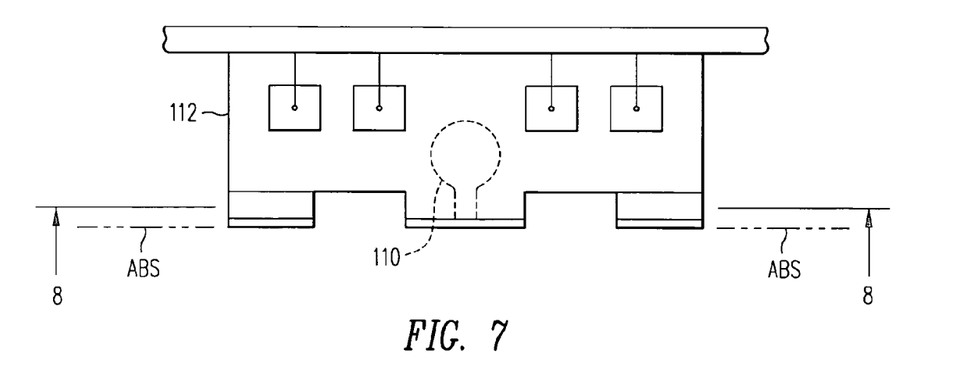
FIG. 7 is an end view of a slider, not to scale, taken along line 7-7 of FIG. 5.

Referring now to the drawings, wherein like reference numerals designate like or similar parts throughout the several views, FIGS. 5-7 illustrate a magnetic disk drive 100. The drive 100 includes a spindle 102 that supports and rotates one or more magnetic disks 104. The spindle 102 is rotated by a motor 106 that is controlled by a motor controller 108. A combined read and write magnetic head 110 is mounted on a slider 112 that is supported by a suspension 114 and actuator arm 116. A plurality of disks, sliders and suspensions may be employed in a large capacity direct access storage device (DASD) as shown in FIG. 6. The suspension 114 and actuator arm 116 position the slider 112 so that the magnetic head 110 is in a transducing relationship with a surface of the magnetic disk 104. When the disk 104 is rotated by the motor 106, the slider is supported on a thin cushion of air (air bearing) between the surface of the disk 104 and an air bearing surface (ABS) 118. The magnetic head 110 may then be employed for writing information to multiple circular tracks on the surface of the disk 104, as well as for reading information therefrom. Processing circuitry 120 exchanges signals representing such information with the head 110, provides motor drive signals for rotating the magnetic disk 104, and provides control signals for moving the slider to various tracks. The various components making up the disk drive can be mounted on or within a chassis 122.

Figure 8:
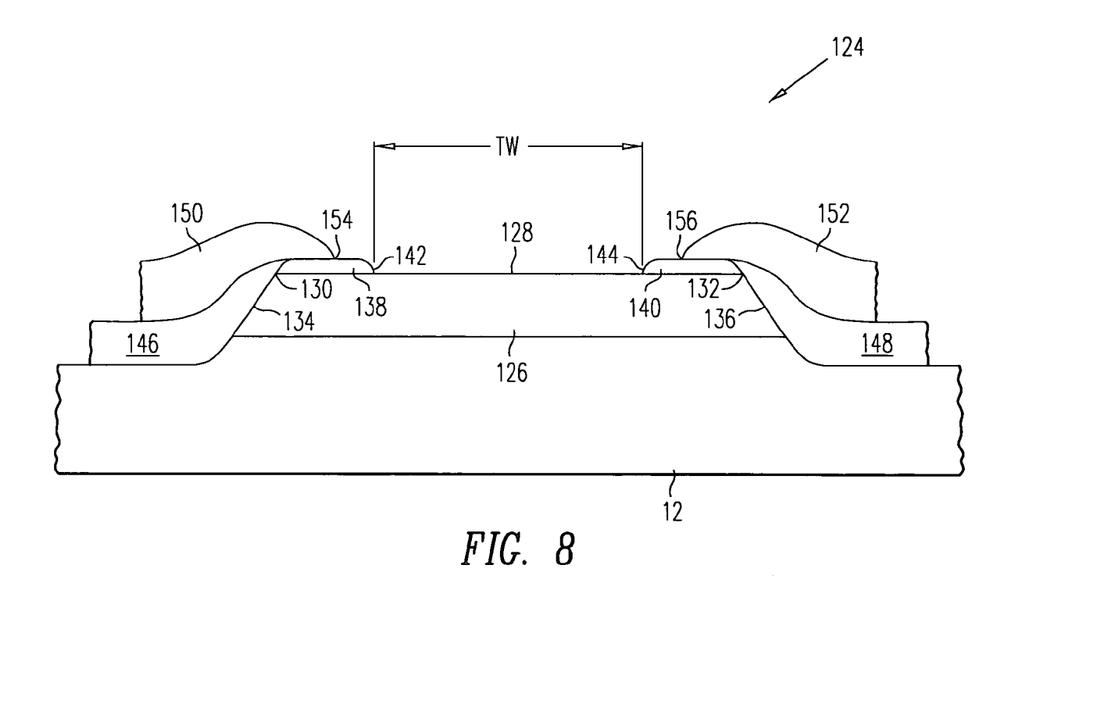
FIG. 8 is a sectional view of a a read head, not to scale and shown enlarged, taken along line 8-8 of FIG. 7.

With reference now to FIG. 8, a cross sectional view, not to scale, as viewed from the ABS is depicted. Those skilled in the art will appreciate that such a magnetic head would also include a write head and first and second shields. However, for purposes of clarity only the read sensor and its associated leads are depicted. The read head includes a magnetoresistive sensor 126, which may be a GMR sensor as described with reference to the background art or could also be some other type of magnetoresistive sensor, such as TMR or AMR. The sensor 126 has a substantially flat surface 128 terminating first and second laterally opposed edges 130, 132. The sensor 126 also has first and second sides 134, 136, which extend from the edges 130, 132 and slope downward to the substrate supporting the sensor 126. The substrate is preferably a non-magnetic electrically insulting gap layer 12 as described with reference to the background art and will hereafter simply be referred to as the substrate 12. It will be appreciated that while the sides 134, 136 are shown and described as sloping and having portions that are somewhat straight, the sides could also be of other configurations. For example, the sensor 126 could have vertical or nearly vertical side walls or they could also have a serpentine configuration or some other shape when viewed in cross section as in FIG. 8.

With continued reference to FIG. 8, first and second thin lead pads 138, 140 are formed on the substantially flat surface 128 of the sensor 126. The thin lead pads 138, 140 extend from inner lead edges 142, 144 to the outer edges 130, 132 of the sensor 126. The distance between the inner edges 142, 144 of the thin lead pads 138, 140 defines the track width TW of the read head 124. Because the lead pads 138,140 are relatively thin, the inner edges 142, 144 can be formed to be well defined and accurately located. While the lead pads could be constructed of various electrically conductive materials, they are preferably Rh. Furthermore, the pads 138, 140 could be of various thicknesses, but are preferably 20-30 nm.

First and second hard bias layers 146, 148, deposited over the substrate 12, extend over the sides 134, 136, and may also extend over a portion of the thin lead layers 130, 132. With reference to FIG. 8, it will be appreciated that the presence of the thin lead layers 138, 140 prevents the hard bias layers from contacting the flat surface of 128 of the sensor, ensuring that only the side portions 136, 134 of the sensor 126 contact the hard bias material 146, 148 and eliminating the "birds beak" problem associated with the prior art. First and second electrically conductive leads are formed over the hard bias material, and over a portion of the thin lead pads 138, 140, and terminate at inner edges 154, 156. Advantageously, the precise location of the inner edges 154, 156 is not critical, however the inner edges 154, 156 somewhere along the top of the thin lead pads 138, 140, and preferably somewhere near the center of the pads 138, 140. Like the pads 138, 140, the leads 146, 148 preferably comprise Rh, although they could be constructed of many electrically conductive materials. The leads 146, 148 could be of various thicknesses, but are preferably 60 to 80 nm, and more preferably are roughly 70 nm thick.

Figure 9:
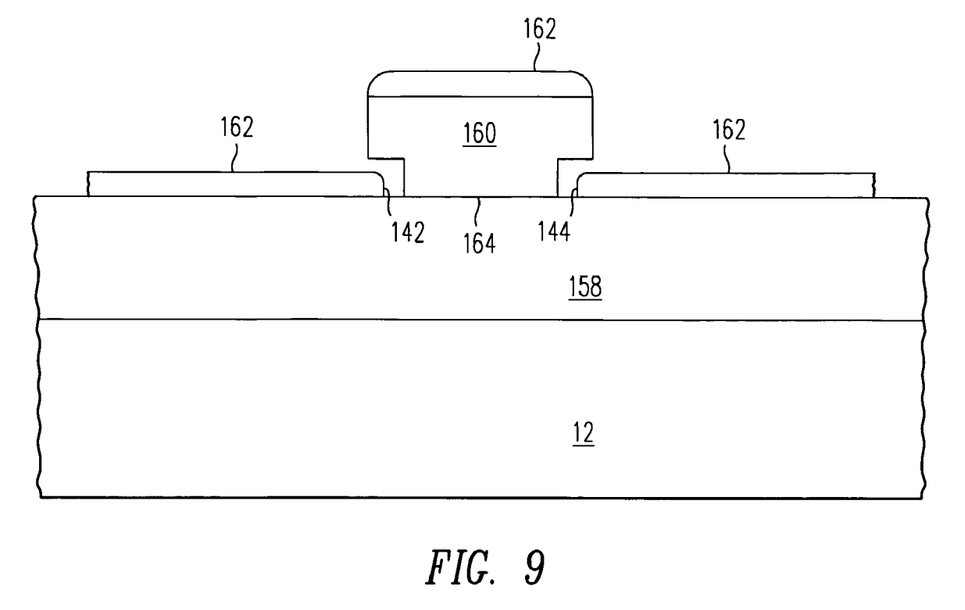
FIG. 9 is a sectional view, not to scale, depicting a step in a process of manufacturing a magnetic head according to the present invention.
Figure 14:
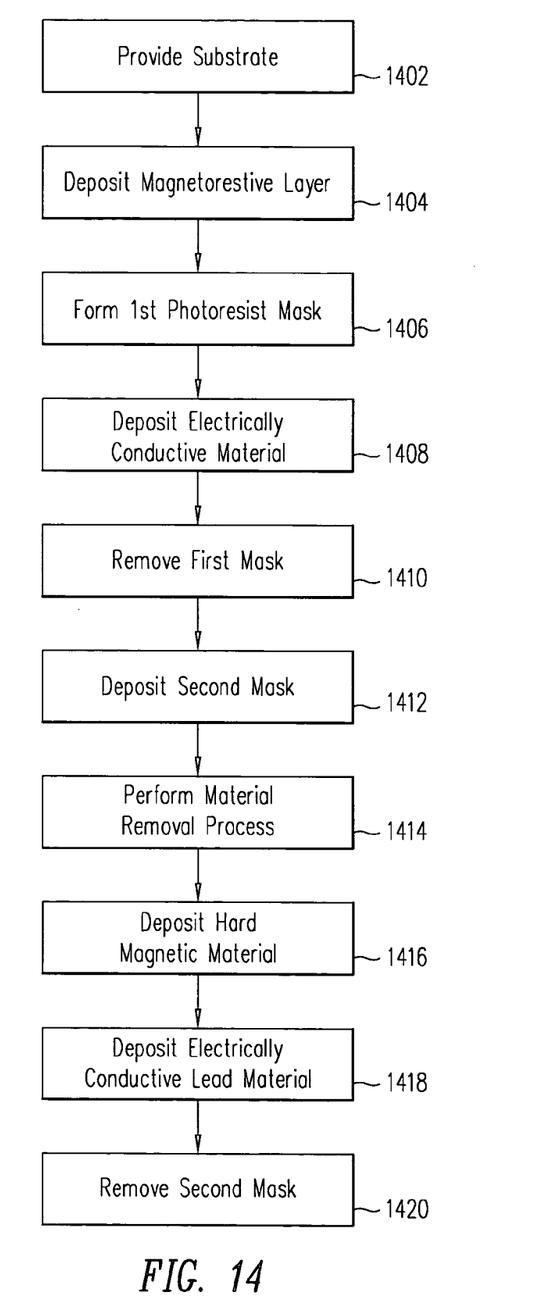
FIG. 14 is a flow chart illustrating steps in method of manufacturing a magnetic head according to the present invention.

With reference now to FIGS. 9 through 14, a method of manufacturing a read head according to the present invention is described. With particular reference to FIGS. 9 and 14, in a step 1402 a substrate is provided. This can be for example, the electrically insulating, non-magnetic gap layer 12, which can itself be formed upon another substrate, such as silicon. Then, in a step 1404, a full film of magnetoresistive materials 158 is deposited. Those skilled in the art will recognize that the full film of magnetoresistive materials 158 is not a single film layer but actually comprises the various material layers making up a magneotresistive sensor such as the GMR sensor described with reference to the prior art. The full film magnetoresistive materials 158 could also comprise various material layers making up some other type of magnetoresistive sensor, such as for example an AMR or TMR sensor. After the sensor material 158 has been deposited, in a step 1406, a photoresist mask 160 is formed in an area to define the track width TW (FIG. 8) of the read head 124. The photoresist layer is preferably a bi-layer photoresist, which facilitates later lift off of the resist layer, but could also be some other mask, such for example a single layer photoresist mask or a mask made of a material other than photoresist. With the mask 160 in place, in a step 1408, a thin full film layer of electrically conductive material 162 is deposited, preferably by sputtering or some similar method. The mask 160 causes the deposited electrically conductive film to define a gap 164 between inner edges 142, 144. This layer of electrically conductive material is deposited relatively thin as compared with the major portion of the leads 152 (FIG. 8). This is advantageous in that it prevents sealing off the photoresist mask 160, and allows a thinner mask to be used. A thin mask structure provides more accurate definition of the deposited material. The thin profile of the layer 162 allows it to be deposited evenly, with relatively abrupt, well defined and accurately located inner edges 142, 144. Therefore, the thin profile of the layer 162 allows the sensor 124 to be constructed with a narrower, better controlled trackwidth. Another important advantage of the present invention is that the photolithographic, and deposition steps 1406, 1408 that define the edges 142, 144 and gap 164 are performed on a completely planar surface. Those skilled in the art will recognize such a flat topography significantly improves the accuracy of the photolithographic process used to construct the mask 160, further facilitating the definition of narrower, better controlled tackwidth. After the layer of electrically conductive material 162 has been deposited, in a step 1410, the mask 160 is lifted off using methods familiar to those skilled in the art.

Figure 10:
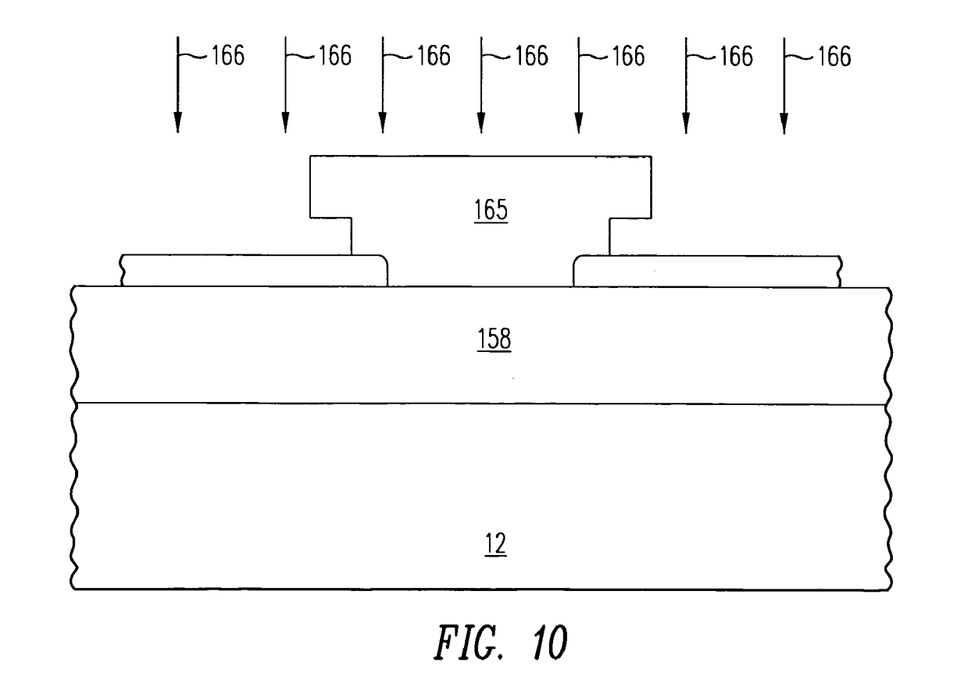
FIG. 10 is a sectional view, not to scale, depicting a step in a process of manufacturing a magnetic head according to the present invention.
Figure 11:
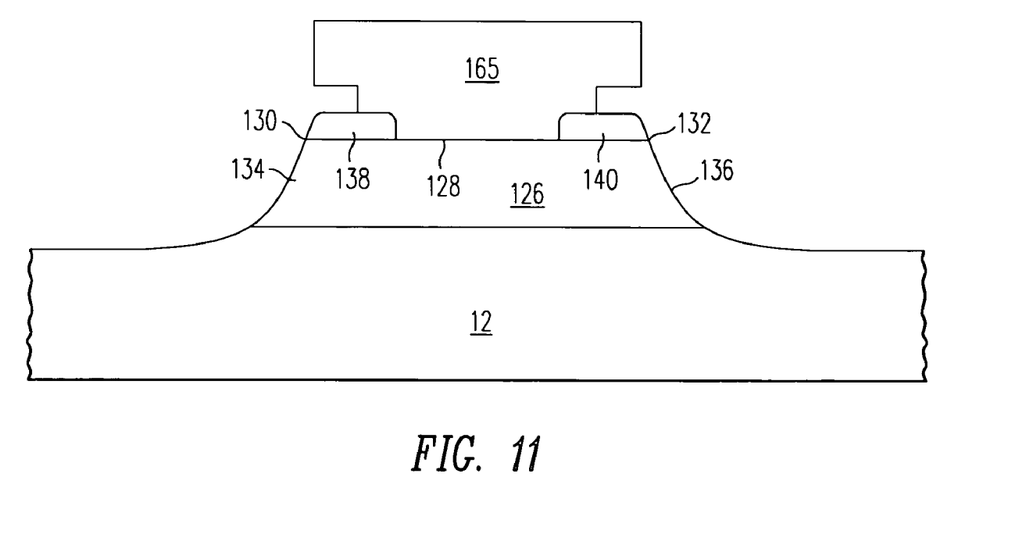
FIG. 11 is a sectional view, not to scale, depicting a step in a process of manufacturing a magnetic head according to the present invention.

With reference now to FIGS. 10 and 14, in a step 1412, a second mask layer 165 is formed. Like the first mask, this second mask 165 can be formed as a bi-layer photoresist, by a photolithographic process. This second mask is configured to be wider than the first mask 160 (FIG. 9). The width of this second mask 165 is chosen so as to define the width of the completed sensor element 126 (FIG. 8), as will become apparent shortly. With the mask 165 in place, in a step 1414, a material removal process represented by arrows 166 is performed. This material removal process is preferably an ion milling operation, but could be some other procedure, such as for example reactive ion etching (RIE). During the material removal procedure 1414 areas not protected by the mask 165 are removed, resulting in a structure as depicted in FIG. 11. The material removal procedure 1414 defines the sensor element 126, having a flat upper surface 128 terminating in laterally opposed side edges 130, 132 and having sides 134, 136. The material removal procedure 1414 also completes the definition of the thin lead pads 138, 140.

Figure 12:
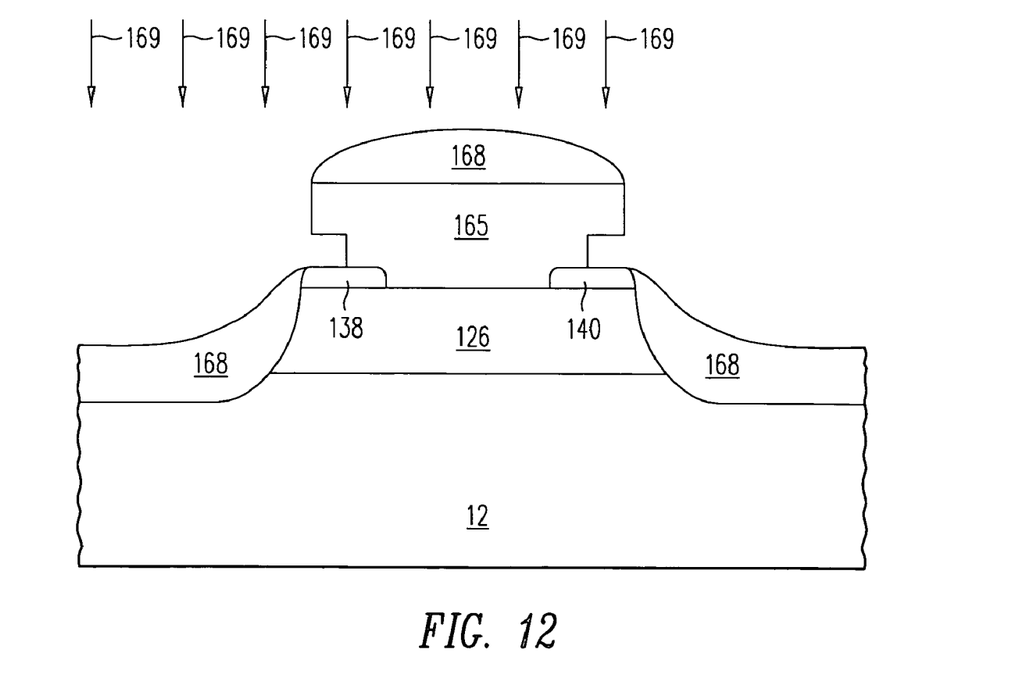
FIG. 12 is a sectional view, not to scale, depicting a step in a process of manufacturing a magnetic head according to the present invention.
Figure 13:
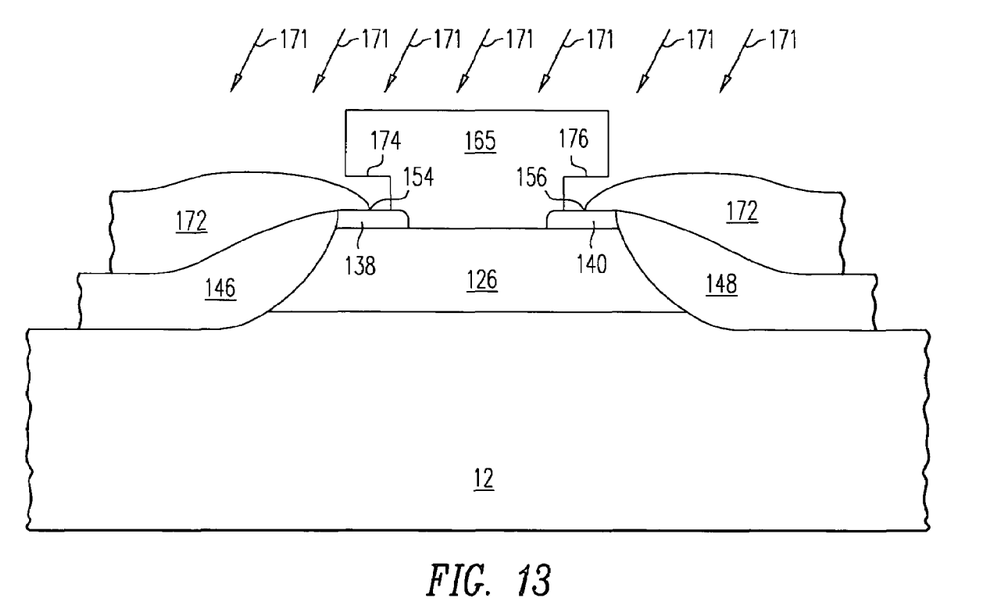
FIG. 13 is a sectional view, not to scale, depicting a step in a process of manufacturing a magnetic head according to the present invention.

With reference now to FIGS. 12 and 14, in a step 1416 with the second mask 165 still in place, a layer of hard magnetic material 168 is deposited, the deposition process being represented by vertical arrows 169. This produces the hard bias layers 146, 148 described earlier with reference to FIG. 8. Then, as described with reference to FIGS. 13 and 14, in a step 1418, an electrically conductive lead material 172 is deposited forming the leads 150, 152 described with reference to FIG. 8. As illustrated by the diagonal arrows 171, the deposition of the lead material 172 is performed at an angle. This allows the lead material to be deposited further into the undercuts 174, 176 of the bi-layer resist structure 165 with result that the deposited material 172 will be in electrical contact with the pads 138, 140. Because the deposition process is performed in a sputtering chamber on a rotating platter, the angled deposition will provide even deposition with each of the undercuts 176, 174. Since the track width TW of the sensor and the overall sensor width have already been defined, the precise location of the endpoints 154, 156 is not critical. This is advantageous in that the more critical lithographic and deposition steps were performed on a planar surface, leaving the less critical hard bias and lead depositions 169, 171 to be performed on the more severe topography of the sensor 126. In a step 1420, the second mask layer 165 is lifted off resulting in the read head described with reference to FIG. 8.

Figure 15:
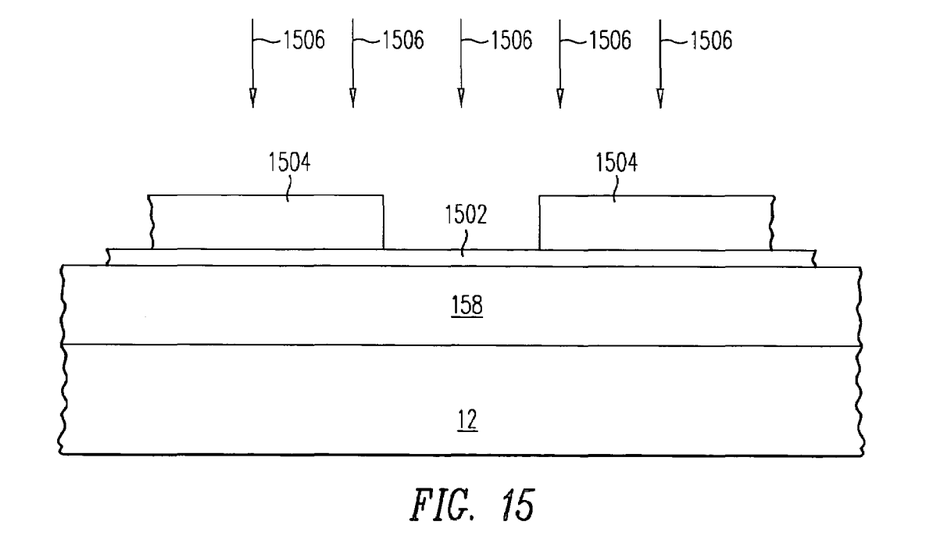
FIG. 15 is a sectional view, not to scale, depicting a step in an alternate method of manufacturing a magnetic head according to the present invention.

Various processes can be performed to complete construction of a combination read/write head. Since these processes are familiar to one skilled in the art they are omitted for purposes of clarity. In addition various modifications will become apparent to one skilled in the art which would still be contemplated by the present invention. By way of example in an alternate method of constructing such a read head 124 (FIG. 8) the gap 164 (FIG. 9) in the thin electrically conductive material layer can be formed by a material removal process. With reference to FIG. 15 a full film of thin electrically conductive material 1502 can be deposited onto the GMR material layer 158. Then a mask can be constructed to expose the portions where the gap 164 is desired. A material removal process, represented as arrows 1506 can then be performed to selectively remove the exposed portions of the thin lead material. The material removal process could be for example, but not limited to reactive ion etching (RIE) or ion milling. Furthermore, both the material used for the thin electrically conductive layer and material removal process can be selected such that the material removal process will selectively remove the thin electrically conductive layer while reacting relatively little with the underlying sensor materials 158.

Furthermore, should design requirement necessitate a larger contact area between the leads 150, 152 and the pads 138, 140, an alternate method of manufacture could be employed. In such an alternate method, a third mask structure (not shown) could be formed after formation of the hard bias layers 146, 148. This third photo resist structure would then be wider than the first photoresist structure, but narrower than the second. In such a method of manufacture, the deposition of the lead material (also not shown) may or may not be performed at an angle, depending upon design requirements.

Other embodiments and modification of this invention will no doubt occur to those of ordinary skill in the art in view of these teachings. Therefore, this invention is to be limited only by the following claims, which include all such embodiments and modifications.

What is claimed is:

1. A method of constructing a magnetic sensor, comprising the steps of:
   depositing a layer of magnetoresistive sensor material;
   forming an electrically conductive layer having a gap, a width of said gap defining a track width, the first electrically conductive material layer and gap being formed by forming a first mask structure having a width configured to define the track width, then depositing a layer of electrically conductive material, over the magnetoresistive sensor material and the first mask structure and thereafter removing the first mask structure to form the gap;
   after depositing the electrically conductive material and removing the first mask structure, forming a second mask structure, said second mask structure shielding said gap and a portion of said electrically conductive layer adjacent to said gap;
   after forming the second mask structure, performing a material removal process to remove exposed portions of said electrically conductive layer and said magnetoresistive sensor material; and
   depositing a magnetic material prior to removing said second mask structure.

2. The method as recited in claim 1 wherein said material removal process is reactive ion etching.

3. The method as recited in claim 1 wherein said material removal process is ion milling.

* * * * *